United States Patent [19]
Allen

[11] 3,893,705
[45] July 8, 1975

[54] TRANSPORTABLE RACK CONSTRUCTION
[75] Inventor: Donald D. Allen, Pittsburgh, Pa.
[73] Assignee: Cobbledick-Kibbe Glass Company, Oakland, Calif.
[22] Filed: Apr. 29, 1974
[21] Appl. No.: 465,043

[52] U.S. Cl. ....... 280/179 R; 105/366 C; 248/369 R
[51] Int. Cl. ............................................. B60p 7/00
[58] Field of Search ................... 280/179 R, 179 A; 105/369 R, 369 A, 369 BC, 366 R, 366 C, 366 E, 367; 248/361 R

[56] References Cited
UNITED STATES PATENTS

| | | | |
|---|---|---|---|
| 2,940,402 | 6/1960 | Hansen | 105/367 |
| 3,172,371 | 3/1965 | Gutridge | 248/361 R |
| 3,282,229 | 11/1966 | Elsner | 105/369 R |
| 3,374,008 | 3/1968 | Blunden | 280/179 R |
| 3,498,238 | 3/1970 | Sweger | 105/366 C |

Primary Examiner—Robert R. Song
Attorney, Agent, or Firm—Townsend and Townsend

[57] ABSTRACT

The present invention provides a system for transporting flat glass from the wholesaler to a dealer or job site. The system employs a flat bed truck having at least one row of slots formed in the bed and a plurality of transverse pins located in the respective slots. A rack is provided which is adapted to support a quantity of flat glass. The rack includes a base portion adapted to rest on the flat bed of the truck for transporting the glass thereon. A pair of hooks are provided, one disposed at each end of the base portion of the rack. The hooks are adapted to selectively project downwardly into respective slots in the truck bed and releasably engage the pins associated with the respective slots to fix the rack to the truck bed for transportation of the glass. The hooks can be released from the pins to allow the rack containing the quantity of flat glass thereon to be removed from the truck bed.

11 Claims, 6 Drawing Figures

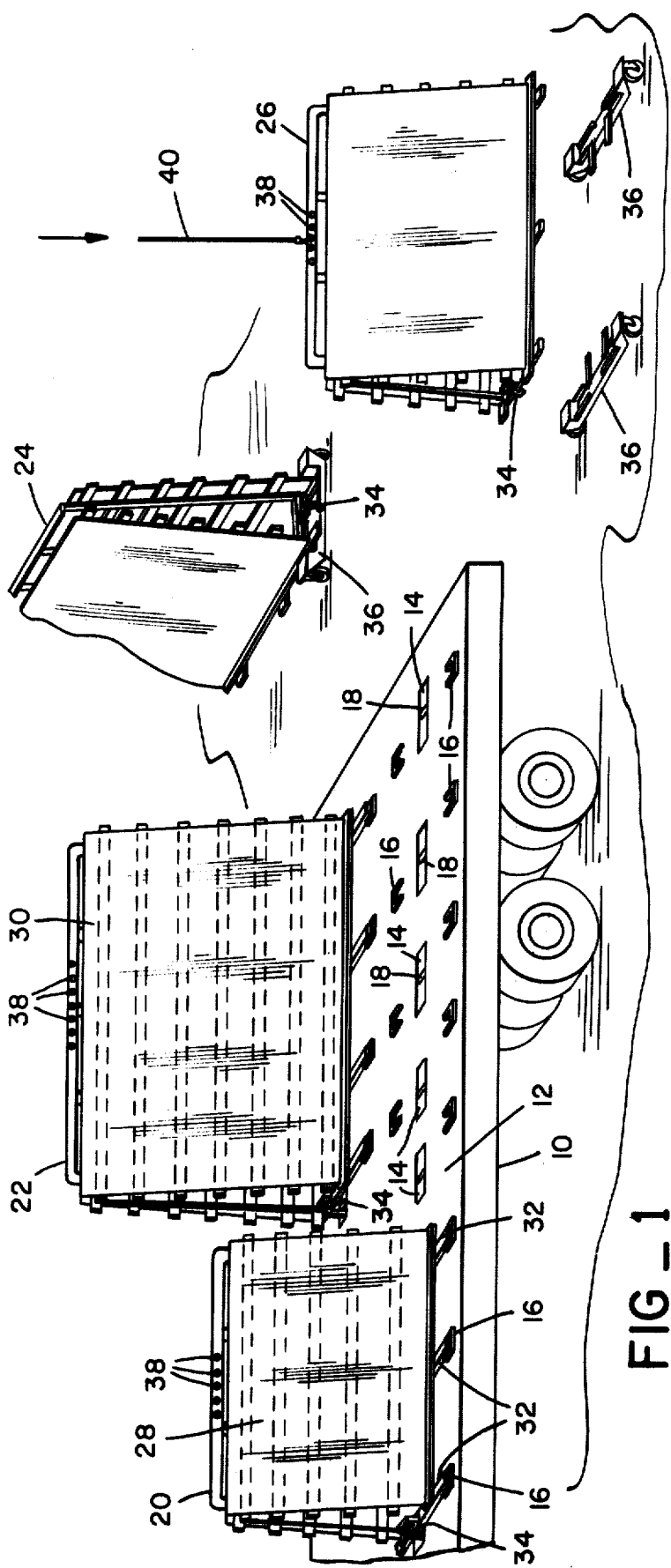
FIG_1
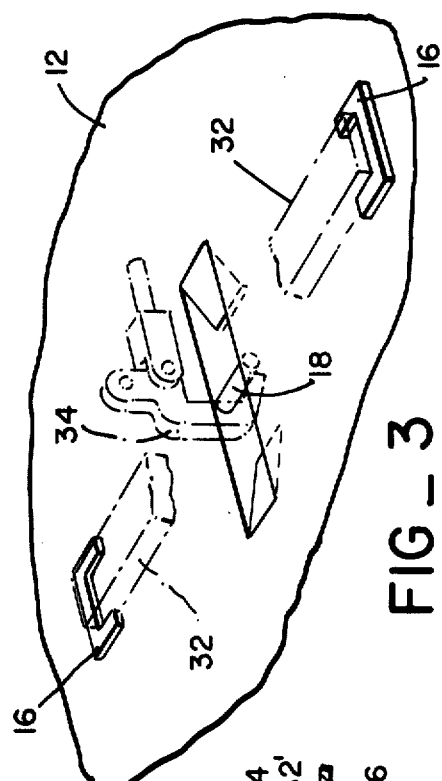
FIG_3
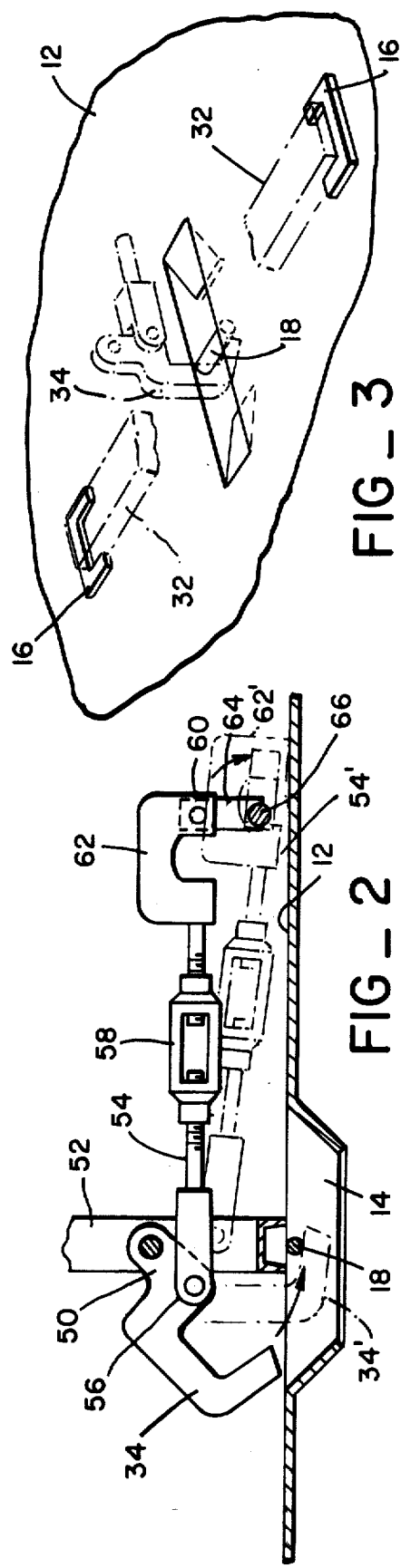
FIG_2

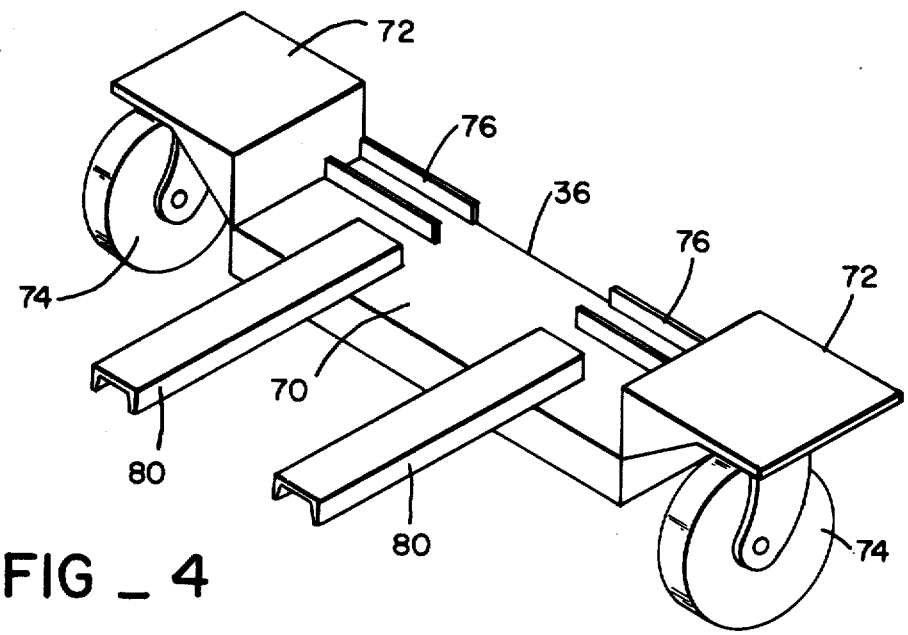
FIG_4
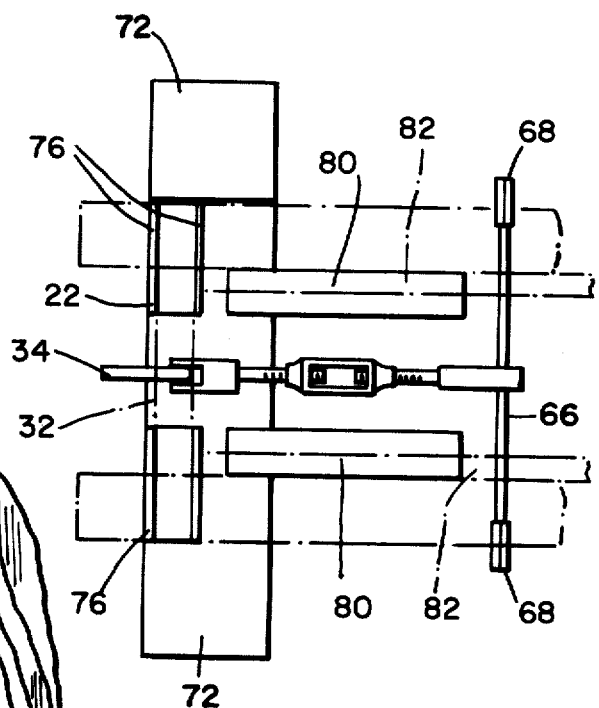
FIG_5
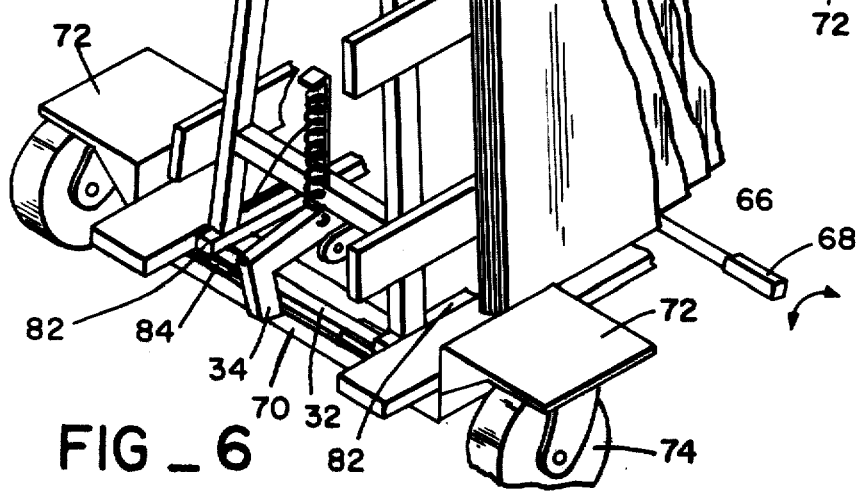
FIG_6

TRANSPORTABLE RACK CONSTRUCTION

BACKGROUND OF THE INVENTION

The present invention relates to a system for transporting flat glass from a warehouse or distribution point to a dealer or job site.

In the traditional method for shipping glass from the factory to the point of use, the glass was first cut into relatively small sizes at the factory, no one dimension exceeding approximately 12 feet, and packed into wooden cases. The wooden cases containing the glass were shipped to a wholesaler who then ordinarily shipped the cases intact to various retailers. If the wholesaler had smaller customers, the cases would be broken down in individual lights and sent to the smaller retailers on trucks having rigid A-frames attached to the truck bed.

The traditional method for transporting glass from the factory to the retailer is gradually being replaced by a more modern method. According to this latter method, the glass is shipped from the factory to the wholesaler in relatively large panes, approximately 11 by 17 feet, in specially designed railway cars having high ceilings. The wholesaler then by the glass into standard sizes ranging from 5 to 7 feet to 9 to 11 feet and sends the cut glass individually to the retailer. This allows the wholesaler to send each retailer the precise amount of glass that he requires at any given time, and is far more versatile and efficient than the traditional method for shipping such glass. However, in this more modern method, the glass is usually still transported on standard glass trucks having A-frames attached as mentioned above for sending the glass to the retailer or direct to a job site. At the retailer or at the job site, the glass must be unloaded from the truck and moved about by other means. This results in excessive handling of the glass and increases the likelihood that it gets chipped, broken, or otherwise damaged, and also requires a substantial amount of manual labor to move the glass from place to place.

SUMMARY OF THE INVENTION

The present invention provides a system for transporting flat glass from the wholesaler to a dealer or job site. The system employs a flat bed truck having at least one row of slots formed in the bed and a plurality of transverse pins located in the respective slots. A rack is provided which is adapted to support a quantity of flat glass. The rack includes a base portion adapted to rest on the flat bed of the truck for transporting the glass thereon. A pair of hooks are provided, one disposed at each end of the base portion of the rack. The hooks are adapted to selectively project downwardly into respective slots in the truck bed and releasably engage the pins associated with the respective slots to fix the rack to the truck bed for transportation of the glass. The hooks can be released from the pins to allow the rack containing the quantity of flat glass thereon to be removed from the truck bed.

The invention further provides a pair of dollies on which the rack containing the quantity of flat glass can be moved when not on the truck bed. Dollies can be provided both at the distribution point and at the dealer or job site for easy movement of the glass on the rack without handling the glass itself.

In many situations, the rack containing the glass can be rolled to the installation point of the glass. In this manner, manual handling of the glass itself is minimized both a the distribution point and at the dealer or job site. This greatly simplifies the handling of the glass, and also minimizes the likelihood of its being chipped, broken, or otherwise damaged. In the preferred embodiment of the present invention, apparatus is provided for locking the hooks to the bed of the truck using toggle locking principles so that the rack can very easily be attached to the truck at the wholesaler and released at the dealer or job site, further simplifying the operation of the present invention.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of the system of the present invention;

FIG. 2 is a side elevation view of the hook apparatus of the present invention;

FIG. 3 is a perspective view of the hook apparatus of the present invention;

FIG. 4 is a perspective view of the dolly used in the present invention;

FIG. 5 is a top fragmentary view of the rack of the present invention loaded on the dollies;

FIG. 6 is a fragmentary perspective view of the rack of the present invention loaded on the dollies.

DESCRIPTION OF THE PREFERRED EMBODIMENT

The overall system of the present invention is illustrated by way of reference to FIG. 1. A truck 10 having a flat bed 12 is provided, preferably as the trailer of a tractor/trailer combination. Flat bed 12 has two longitudinally oriented and aligned individual rows of slots 14. Inwardly opening U-shaped guides 16 are located on either side of each slot 14. A transverse pin 18 is located in each of the various slots 14 and extends across the width of the respective slots.

A plurality of racks such as 20, 22, 24 and 26 form elements of the system. The racks 20-26 can be of various sizes to support different sizes of glass lights 28, 30. Each rack 20-26 has a generally A-shaped configuration, and the base of each rack has a plurality of transverse members 32 which fit into the guides 16 on the flat bed 12 of truck 10. Hooks 34 are provided at the opposite ends of the bases of racks 20-26 for attachment of the racks to pins 18 in flat bed 12, as will be further illustrated hereinafter. The lengths of racks 20-26 are each an even multiple of the spacing between perspective apertures 14, e.g. rack 20 has a length equal to twice the spacing between apertures and rack 22 has a spacing equal to three times the distance between apertures. In this manner, racks of different sizes can be placed on the truck bed, and hooks 34 on the opposite ends thereof will be in position to engage respective pins 18 in the truck bed.

A plurality of dollies 36 are provided which also form part of the preferred embodiment of the present invention. When not placed on the truck, racks 20-26 are placed on a pair of dollies 36 so that they can be easily removed around with the glass lights supported thereon. Racks 20-26 can thus be transported on dollies 36 at the distribution point prior to shipment by a truck 10 to the retailer or job site. At the retailer or the job site, racks 20-26 can be reloaded on dollies 36 for movement as desired, even to the point of installation of the glass lights. Transportation of a rack on dollies 36 is illustrated by rack 24. Each rack 20-26 is provided with a plurality of holes 38 along the top edge thereof so that the racks can easily be loaded and unloaded from the truck by means of a crane hoist 40 as illustrated by rack 26 in FIG. 1.

The apparatus used to secure each of the racks to the flat bed 12 of the truck is illustrated in more detail by way of reference to FIG. 2. As discussed above, flat bed 12 has a plurality of slots 14, and a transverse pin 18 spanning each slot. A C-hook 34 is provided which has a depending arm portion 50, the free end of which is pivotably attached to a frame member 52 of the rack. C-hook 34 is thus pivotable from a raised disengaged position downwardly to an engaged position as illustrated in phantom at 34'. In the engaged position 34', C-hook 34 is engaged with pin 18 to secure the rack to flat bed 12 of the truck.

An armature 54 is provided, one end 56 of which is pivotably attached to C-hook 34 at the fixed end of depending arm portion 50. Armature 54 passes below the point of attachment of C-hook 34 to frame member 52 so that movement of armature 54 relatively away from C-hook 34 will rotate the C-hook downwardly to position 34'. In order to adjust the amount of movement of C-hook 34 caused by movement of armature 54, a turnbuckle 58 is provided in armature 54 to control its length.

The opposite end 60 of armature 54 from end 56 comprises a downwardly opening U-shaped member 62. The free end of member 62 to a attached to stud 64 projecting normally from a transverse rotatable bar 66. Rotation of rotatable bar 66 in the clockwise direction will move U-shaped member 62 away from the relative position of C-hook 34 and downwardly so that it fits over the rotatable arm as illustrated at 62'. In this position, tension on armature 54' will further bias U-shaped member 62 downwardly to form a toggle lock and prevent disengagement of C-hook 34 from its engaged position 34'. Rod 66 is manually rotated by means of a removable lever (not shown) so that hook 34 can easily be engaged and disengaged.

As discussed above, guides 16 act to align the rack by engaging one of the transverse members 32 forming the base of the rack. In this position, C-hook 34 can easily be engaged with pin 18 as illustrated in FIG. 3. Furthermore, when the C-hook is locked in the engaged position, it forces the rack and frame members 32 thereof downwardly so that they are locked in position in guides 16. Thus, the combination of C-hook 34 and guides 16 rigidly fixed the rack in position so that the glass will not be damaged as it is being transported.

The dolly 36 of the present invention is illustrated in the perspective view of FIG. 4. Dolly 36 has a depressed central portion 70 adapted to support the rack, and raised side portions 72 overlying wheels 74. This configuration minimizes the height of the rack containing the glass above the floor or ground for ease in handling. A pair of guides 76 are disposed on depressed portion 70 of dolly 36. A pair of downwardly opening channel members 80 are also provided to support the rack so that the rack will be balanced on wheels 74.

As is evident from viewing FIGS. 5 and 6, racks such as 20 include longitudinal base members 82 running along their length. Channel members 80 will be partially disposed beneath longitudinal members 82 to provide further support to rack 20. Transverse member 32 on rack 20 fits into guides 76. C-hook 34 is maintained in the raised position by means of a spring 84 so it does not interfere with the operation of dolly 36. Hence, rack 20 containing lights 28 thereon can easily be transported from place to place on dollies for convenience in transportation of the glass. As is evident from the above, the glass need not be removed from frame 20 or handled individually in any manner from the time that it is loaded onto the rack at the wholesaler until it is ready for use at the dealer or job site. Loading and unloading of the racks can easily be accomplished with a crane hoist. C-hook 34 is engaged and disengaged from the truck bed at the time of loading or unloading by inserting a lever (not shown) into a mating socket 68 on either end of rod 66 and turning the rod in the appropriate direction.

While a preferred embodiment of the present invention has been illustrated in detail, it is apparent that modifications and adaptations of that embodiment will occur to those skilled in the art. For example, other means of undercutting the flat bed of the truck could be provided rather than the pins disclosed herein. However, it is to be expressly understood that such modifications and adaptations are within the spirit and scope of the present invention, as set forth in the following claims.

What is claimed as new is:

1. A system for transporting flat glass from a distribution point to a dealer or job site, said system comprising:
    a truck bed having at least one row of slots formed therein and a plurality of pins located in the respective slots, one of the pins at least partially spanning each of the slots;
    a rack adapted to support a quantity of flat glass, said rack including a base portion adapted to be placed on the truck bed for transporting the glass thereon;
    a pair of hooks, one hook disposed at each end of the base portion of the rack, said hooks adapted to selectively project downwardly into respective slots in the truck bed and releasably engage the pins associated with the respective slots to fix the rack to the truck bed for transportation of glass, said hooks being releasable from said pins to allow the rack containing the quantity of flat glass thereon to be removed from the truck bed; and
    means for actuating the hooks so that said hooks project downwardly into respective slots in the truck bed, said actuating means including toggle locking means for locking the hooks in the engaged position.

2. A system as recited in claim 1 wherein the truck bed includes a pair of transverse guides associated with each slot, and wherein the base of the rack includes transverse members at least at its ends adapted to fit into said guides when the rack is placed on the truck bed to align the hooks at the base of the rack with two of the slots formed in the truck bed.

3. A system as recited in claim 1 and additionally comprising at least one pair of dollies, said dollies adapted to support the rack when other than on the truck bed for movement of the rack containing a quantity of flat glass thereon at the distribution point and the job site.

4. A system as recited in claim 1 wherein said actuating means additionally includes spring bias means adapted to normally maintain the pair of hooks in the raised position.

5. A system as recited in claim 1 and additionally comprising a plurality of racks of different sizes, said racks adapted to support flat glass of differing dimensions, the base of each said rack having a length generally equal to a multiple of a distance between the respective slots in the truck bed so that each rack can be placed on the truck bed and the hooks thereof engaged with pins associated with respective slots at the ends of the base of the rack.

6. Apparatus for securing a transportable rack for supporting manufacturing goods to the flat bed of a truck, said flat bed having at least one slot therein and pin means at least partially spanning the slot, said apparatus comprising:
   a C-hook having a depending arm portion, the free end of said arm portion adapted to be pivotally connected to the rack;
   an armature pivotably connected to the fixed end of the arm portion of the C-hook at one end of said armature, the other end of said armature having a downwardly opening u-shaped section, said armature adapted to pass relatively beneath the pivotal connection of the C-hook to the rack; and
   a rod rotatably mounted to the rack transverse to the armature, said rod including a normally mounted stud pivotably connected to said opposite end of the armature so that rotation of the rotatable arm in one direction will translate the armature relatively away from the position of the C-hook and downwardly over the rod and the U-shaped portion of the armature fits over said rod so that the armature is locked to prevent it from returning to its original position, said C-hook being simultaneously rotated downwardly for engagement with the pin means in the slot to secure the rack to the flat truck bed.

7. Apparatus as recited in claim 6 wherein the armature includes a turnbuckle for adjusting the length of said armature.

8. Apparatus as recited in claim 6 and additionally comprising guide means on said flat bed truck for aligning the rack with the slot for engagement of the C-hook with the pin means.

9. In a transportation system including, in combination, a vehicle flat bed and a transportable rack for holding manufactured products and adapted to be loaded on and unloaded from said flat bed, improved means for securing the rack to the vehicle flat bed comprising:
   at least one hook mounted adjacent the lower extremities of said rack;
   at least one undercut formed in said flat bed and including a hook-engagable means;
   a hook actuating mechanism operable to lower each said hook below the level of the base of said rack to a locking position, and to raise each said hook at least to the level of the base of said rack to an unlocked position, said actuating mechanism including toggle locking means for locking each said hook in the engaged position; each said hook projectable through a corresponding undercut formed in said bed and engable with said hook-engagable means to releasably securely engage the underside of said flat bed and to lock said rack against movement relative to said bed when said hooks are actuated to locked position.

10. The combination of claim 9 and wherein guides are provided on said flat bed and wherein said rack is slideably positionable on said flat bed within said guides to a location where each said hook is in vertical registry with a corresponding undercut.

11. A system for transporting flat glass from a distribution point to a dealer or job site, said system comprising:
   a truck bed having at least two parallel rows of slots formed therein and a plurality of transverse pins located in the respective slots, one of the pins spanning each of the slots;
   a rack having a flat base and an A-shaped vertical configuration, the rack adapted to rest upon its base portion on the flat truck bed, said rack adapted to support a quantity of flat glass thereon;
   a C-hook having a depending arm portion, the free end of said arm portion adapted to be pivotally connected to the rack, said C-hook adapted to be normally at least at the level of the base of the rack when disengaged, and adapted to project below the level of the base of the rack in its engaged position;
   an armature pivotably connected to the fixed end of the arm portion of the C-hook at one end of said armature, the other end of said armature having a downwardly opening U-shaped section, said armature adapted to pass relatively beneath the pivotal connection of the C-hook to the rack; and
   a rod rotatably mounted to the rack transverse to the armature, said rod including a normally mounted stud pivotably connected to said opposite end of the armature so that rotation of the rotatable arm in one direction will translate the armature relatively away from the position of the C-hook and downwardly over the rod and the U-shaped portion of the armature fits over said rod so that the amature is locked to prevent it from returning to its original position, said C-hook being simultaneously rotated downwardly for engagement with the pin means in the slot to secure the rack to the flat truck bed.

* * * * *